(12) United States Patent
Catherman et al.

(10) Patent No.: US 7,600,134 B2
(45) Date of Patent: Oct. 6, 2009

(54) THEFT DETERRENCE USING TRUSTED PLATFORM MODULE AUTHORIZATION

(75) Inventors: Ryan C. Catherman, Raleigh, NC (US); David C. Challener, Raleigh, NC (US); James P. Hoff, Raleigh, NC (US); Joseph M. Pennisi, Apex, NC (US); Randall S. Springfield, Chapel Hill, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 536 days.

(21) Appl. No.: 10/984,400

(22) Filed: Nov. 8, 2004

(65) Prior Publication Data
US 2006/0101286 A1    May 11, 2006

(51) Int. Cl.
| | |
|---|---|
| G06F 12/14 | (2006.01) |
| H04L 29/06 | (2006.01) |
| H04L 9/32 | (2006.01) |
| G06F 21/00 | (2006.01) |
| G08B 29/00 | (2006.01) |
| H04L 9/00 | (2006.01) |
| H04L 9/08 | (2006.01) |
| H04L 9/28 | (2006.01) |

(52) U.S. Cl. .................. 713/193; 713/165; 713/168; 713/171; 713/181; 713/183; 726/4; 726/5; 726/17; 726/34; 380/259; 380/277; 380/284; 380/28

(58) Field of Classification Search .................. 713/193
See application file for complete search history.

(56) References Cited
U.S. PATENT DOCUMENTS

| | | | |
|---|---|---|---|
| 5,657,470 A | 8/1997 | Fisherman et al. | .......... 395/480 |
| 5,748,744 A | 5/1998 | Levy et al. | ..................... 380/52 |
| 6,272,632 B1 * | 8/2001 | Carman et al. | .............. 713/168 |
| 6,463,537 B1 | 10/2002 | Tello | .......................... 713/182 |

(Continued)

FOREIGN PATENT DOCUMENTS

GB        2439838  A   *   1/2008

OTHER PUBLICATIONS

Stumpf et al, Enhancing Trusted Platform Modules with Hardware-Based Virtualization Techniques, 2008, IEEE, pp. 1-9.*

(Continued)

*Primary Examiner*—William R Korzuch
*Assistant Examiner*—Aravind K Moorthy
(74) *Attorney, Agent, or Firm*—Sawyer Law Grooup; Carlos Munoz-Bustamante

(57) ABSTRACT

A method for theft deterrence of a computer system is disclosed. The computer system includes a trusted platform module (TPM) and storage medium. The method comprises providing a binding key in the TPM; and providing an encrypted symmetric key in the storage medium. The method further includes providing an unbind command to the TPM based upon an authorization to provide a decrypted symmetric key; and providing the decrypted symmetric key to the secure storage device to allow for use of the computer system. Accordingly, by utilizing a secure hard disk drive (HDD) that requires a decrypted key to function in conjunction with a TPM, a computer if stolen is virtually unusable by the thief. In so doing, the risk of theft of the computer is significantly reduced.

6 Claims, 3 Drawing Sheets

U.S. PATENT DOCUMENTS

| | | | |
|---|---|---|---|
| 6,487,646 B1 | 11/2002 | Adams et al. | 711/163 |
| 6,654,890 B1 | 11/2003 | Girard | 713/200 |
| 6,725,382 B1* | 4/2004 | Thompson et al. | 726/19 |
| 7,010,691 B2* | 3/2006 | Wheeler et al. | 713/170 |
| 7,117,376 B2* | 10/2006 | Grawrock | 380/277 |
| 7,281,125 B2* | 10/2007 | Challener et al. | 713/2 |
| 7,290,288 B2* | 10/2007 | Gregg et al. | 726/28 |
| 7,299,354 B2* | 11/2007 | Khanna et al. | 713/165 |
| 7,380,119 B2* | 5/2008 | Bade et al. | 713/155 |
| 7,421,588 B2* | 9/2008 | Challener et al. | 713/193 |
| 7,430,668 B1* | 9/2008 | Chen et al. | 713/187 |
| 2001/0005886 A1 | 6/2001 | Stratton et al. | 713/166 |
| 2002/0087877 A1 | 7/2002 | Grawrock | 713/200 |
| 2003/0097585 A1 | 5/2003 | Girard | 713/200 |
| 2003/0188179 A1 | 10/2003 | Challener et al. | 713/193 |
| 2003/0212911 A1* | 11/2003 | Challener et al. | 713/202 |
| 2003/0226040 A1* | 12/2003 | Challener et al. | 713/202 |
| 2004/0151319 A1* | 8/2004 | Proudler | 380/277 |
| 2005/0060561 A1* | 3/2005 | Pearson et al. | 713/194 |
| 2005/0111664 A1* | 5/2005 | Ritz et al. | 380/255 |
| 2005/0149729 A1* | 7/2005 | Zimmer et al. | 713/168 |
| 2005/0216753 A1* | 9/2005 | Dailey et al. | 713/191 |
| 2007/0226496 A1* | 9/2007 | Maletsky et al. | 713/168 |
| 2009/0064292 A1* | 3/2009 | Carter et al. | 726/5 |

OTHER PUBLICATIONS

Barrett et al, Frameworks Built on the Trusted Platform Module, 2006, IEEE, pp. 59-62.*

David Lutz, Federation Payments using SAML Tokens with Trusted Platform Modules, 2007, IEEE, pp. 363-368.*

Guan et al, Efficient Identity-Based Key Issue with TPM, 2008, IEEE, pp. 2354-2359.*

* cited by examiner

THEFT DETERRENCE USING TRUSTED PLATFORM MODULE AUTHORIZATION

FIELD OF THE INVENTION

The present invention relates generally to computers and more particularly to deterring the theft of computers.

BACKGROUND OF THE INVENTION

Laptops and desktop computers are utilized extensively in many environments. It is important that unauthorized users be deterred from stealing the computers. For example, if someone steals a laptop or desktop computer, the system should not be usable for that person. The cost for making the system useable after a theft should be high enough to make the theft unprofitable.

Accordingly, what is needed is a system and method for deterring the theft of a laptop and desktop computer is required. The system should be easily implemented in existing systems and should be cost effective and easily adapted to existing systems. The present invention addresses such a need.

SUMMARY OF THE INVENTION

A method for theft deterrence of a computer system is disclosed. The computer system includes a trusted platform module (TPM) and storage medium. The method comprises providing a binding key in the TPM; and providing an encrypted symmetric key in the storage medium. The method further includes providing an unbind command to the TPM based upon an authorization to provide a decrypted symmetric key; and providing the decrypted symmetric key to the secure storage device to allow for use of the computer system.

Accordingly, by utilizing a secure hard disk drive (HDD) that requires a decrypted key to function in conjunction with a TPM, a computer if stolen is virtually unusable by the thief. In so doing, the risk of theft of the computer is significantly reduced.

DETAILED DESCRIPTION

The present invention relates generally to computers and more particularly to deterring theft of computers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention includes a trusted platform module (TPM), an encrypted symmetric key and a secure hard disk drive (HDD) that requires the symmetric key to function. Through this system and method a computer if stolen is virtually unusable by the thief. To describe the features of the present invention in more detail, refer now to the following description in conjunction with the accompanying drawings.

The present invention takes advantage of these features to provide a system and method in accordance with the present invention.

Figure 1:
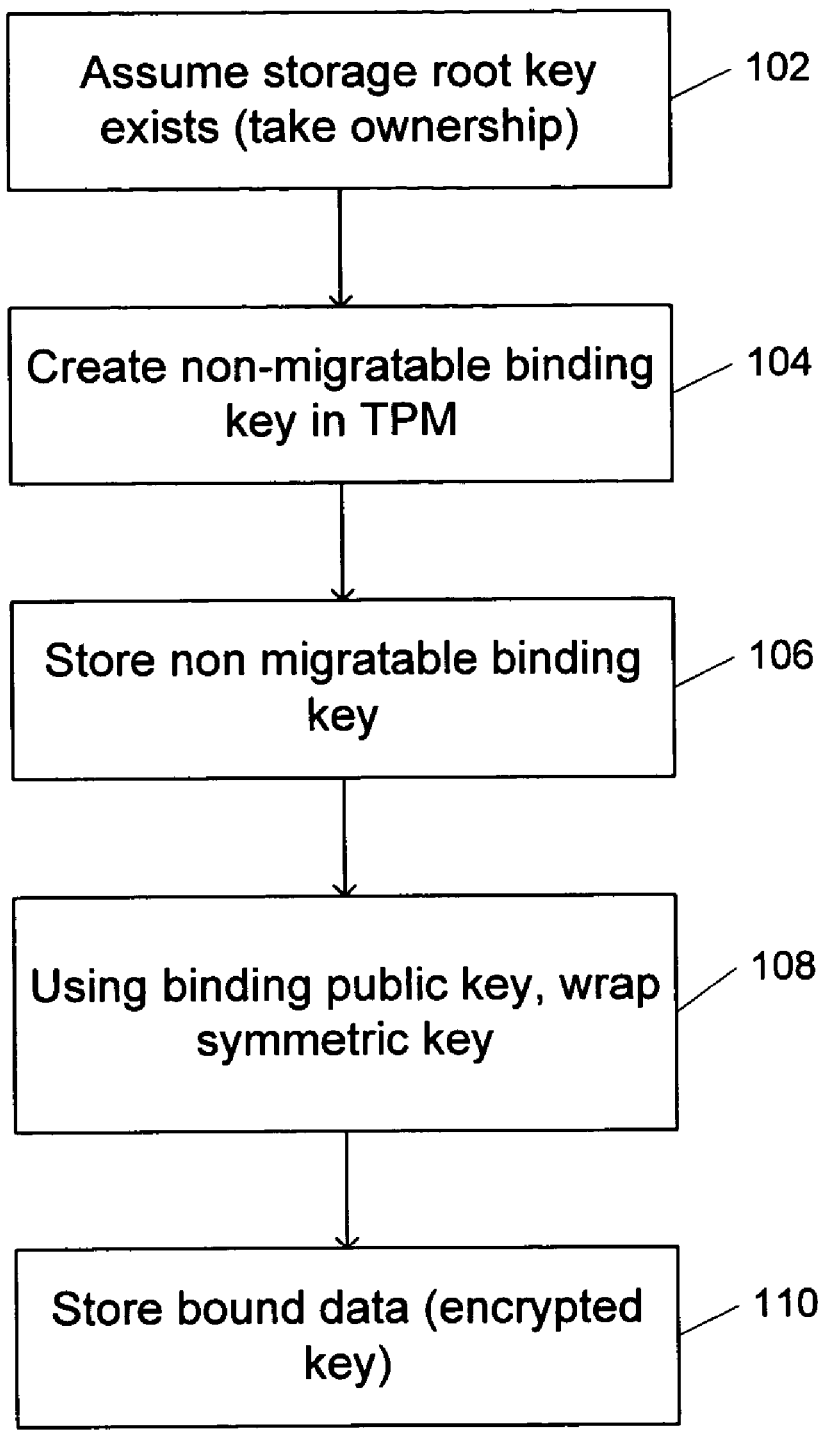
FIG. 1 is a flow chart which illustrates the setup of the system.

Referring to FIG. 1, first the system has to be set up. First it must be assumed that a storage root key (SRK) exists that allows one to take ownership of the machine, via step 102. Next a non-migratable binding key is created in the TPM, via step 104. Then non-migratable binding key is stored (this key can only be used on this system), via step 106. Thereafter, using the binding public key, a symmetric key is wrapped, via step 108. Thereafter, the valid data of the encrypted symmetric key is stored in a secure storage medium such as a hard disk drive as a blob, via step 110.

Figure 2:
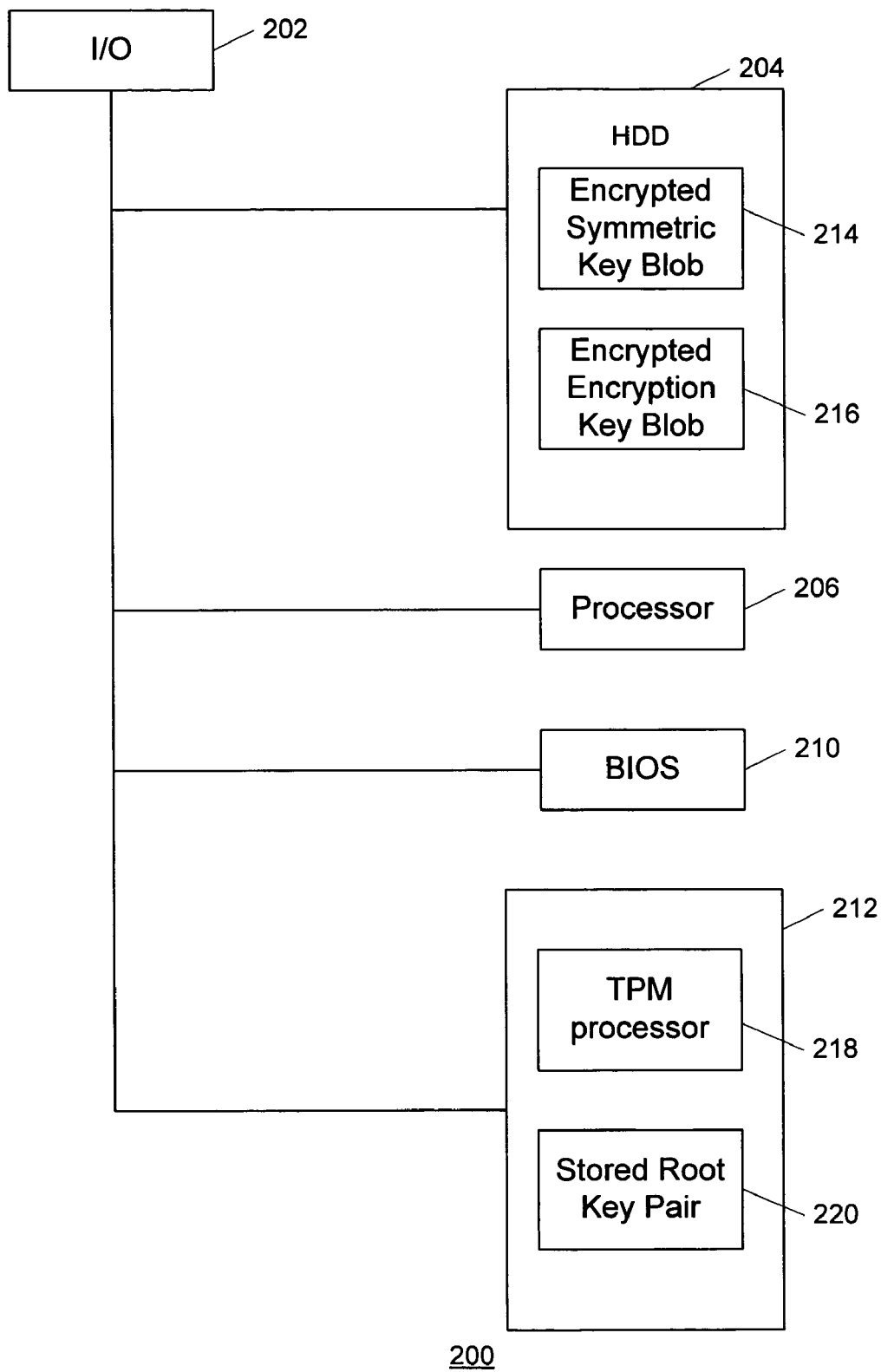
FIG. 2 is a block diagram of a computer system having a Trusted Platform Module (TPM).

After the system is set up, only the user can utilize the computer. FIG. 2 is a block diagram of a computer system 200 in accordance with the present invention. The system 200 includes a processor 206, a storage device 204 which is preferably a hard disk drive or alternately any other type of mass storage device, a Basic Input/Output System (BIOS) 210 and a Trusted Platform Module (TPM) 212.

TPM 212 is the hardware instantiation of a Trusted Computing Platform Alliance (TCPA) subsystem. The TCPA subsystem, whose specification is described in TCPA Main Specification Version 1.1 and TCPA PC Specific Implementation Specification, Version 1.00, which are incorporated herein by reference, includes TPM 212 and software to control the TCPA subsystem. Coupled to the TPM 212, the processor 206, the storage device 204 is the BIOS 210, a circuit capable of interfacing and communicating with other devices (not shown), typically through a computer network. TPM 212 includes a TPM processor 218, which is capable of encoding/decoding messages received from I/O 202, as well as generating asymmetric pairs of public/private keys. Also included within TPM 212 is the stored root key (SRK) 220. The storage device 204 includes an encrypted symmetric key blob 214 and an encrypted encryption key blob 216 provided during set-up.

Figure 3:
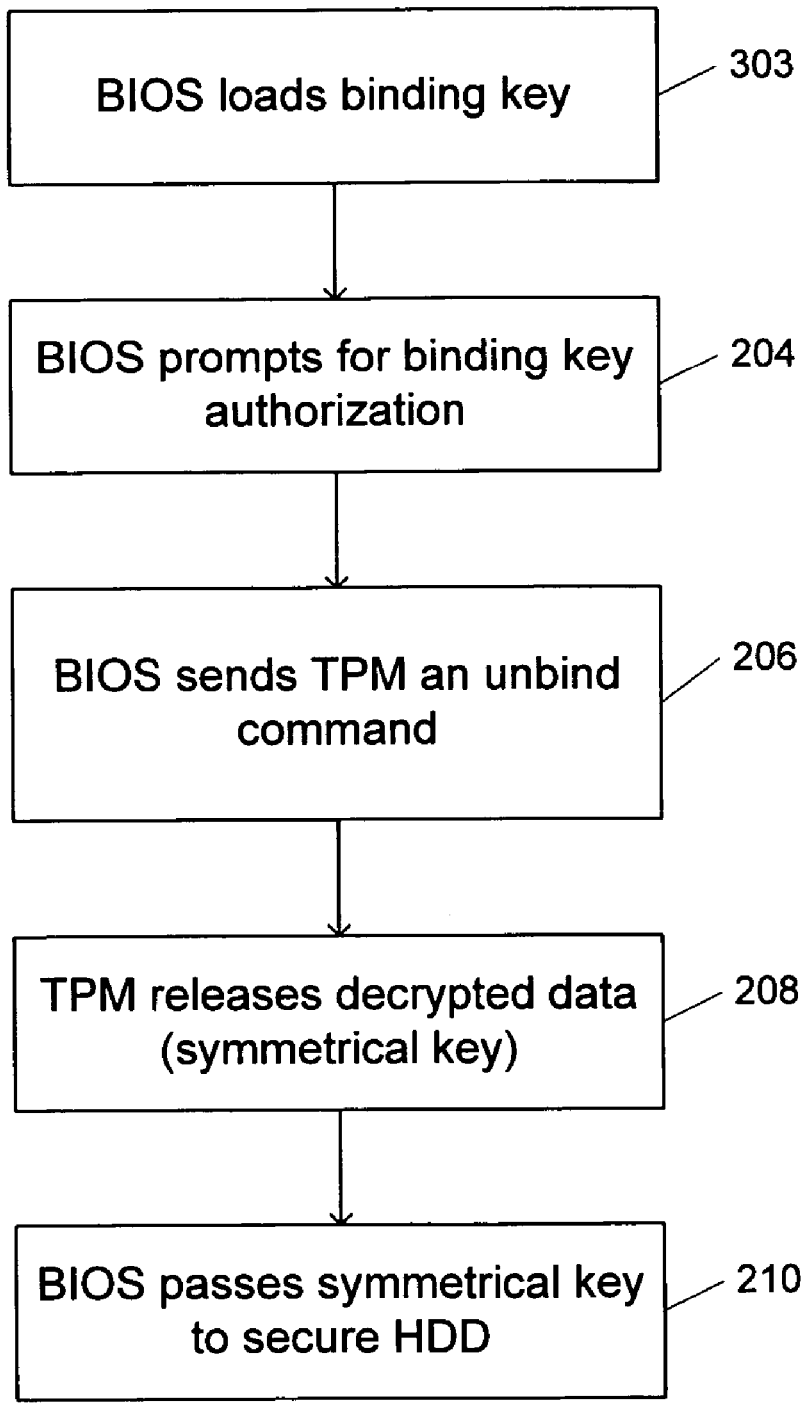
FIG. 3 is a flow chart which illustrates the use of the computer in accordance with the present invention.

FIG. 3 is a flow chart which illustrates the use of the computer 200 in accordance with the present invention. Referring to FIGS. 2 and 3 together, first, the BIOS 210 loads the binding key, via step 302. Then the BIOS 210 prompts for binding key authorization, preferably via a password, via step 304. Once binding key authorization is obtained, the BIOS 210 sends an unbind command to the TPM 212 to provide the decrypted key, via step 306. The unbind command includes the encrypted symmetric key and an authorization digest which is derived from the password authorization prompt. The authorization digest is defined as using this payload for this command during this instance. Therefore using this encrypted symmetric key the authorization is approved.

After the BIOS 210 sends the TPM 212 the unbind command via step 306, the TPM 212 releases the decrypted symmetric key, via step 308. Thereafter the BIOS 210 passes the decrypted symmetric key to the storage device 204, via step 310, which allows for the use of the system.

Accordingly, by utilizing a secure hard disk drive (HDD) that requires a decrypted key to function in conjunction with a TPM, a computer if stolen is virtually unusable by the thief. In so doing, the risk of theft of the computer is significantly reduced.

A system and method in accordance with the present invention can be implemented utilizing a computer readable medium such as a compact disk, floppy disk, DVD disk, or a Flash storage medium.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for theft deterrence of a computer system, the computer system having a trusted platform module (TPM) with a stored root key (SRK), and storage medium requiring a decrypted symmetric key to function in relation to the TPM, the method comprising:

providing a non-migratable binding key loadable by a basic input/output system (BIOS) in the TPM;

providing an encrypted symmetric key and an encrypted encryption key in the storage medium to provide a secure storage medium;

providing an unbind command from the BIOS to the TPM based upon an authorization to provide a decrypted symmetric key, wherein the unbind command includes the encrypted symmetric key and an authorization digest, wherein the authorization digest is derived from a password authorization prompt and is defined as using a particular payload for the unbind command during a particular instance; and providing the decrypted symmetric key to the secure storage medium to enable use of the computer system.

2. The method of claim 1 wherein the BIOS prompts for binding key authorization.

3. A computer system comprising:

a input/output (I/O);

a processor coupled to the I/O:

a trusted platform module (TPM) with a stored root key (SRK), coupled to the I/O, the TPM including a non-migratable binding key loadable by a basic input/output system (BIOS);

the BIOS coupled to the I/O; and a secure storage medium requiring a decrypted symmetric key to function in relation to the TOP and coupled to the I/O, the secure storage medium including an encrypted symmetric key blob, comprised of an encrypted symmetric key and an encrypted encryption key, decryptable by an unbind command provided from the BIOS to the TPM, wherein the unbind command include the encrypted symmetric key and an authorization digest, wherein the authorization digest is derived from a password authorization prompt and is defined as using a particular payload for the unbind command during a particular instance.

4. The computer system of claim 3 wherein the BIOS prompts for binding key authorization.

5. A computer readable medium containing program instructions for theft deterrence of a computer system, the computer system including a trusted platform module (TPM) with a stored root key (SRK), and storage medium requiring a decrypted symmetric key to function in relation to the TPM, the program instructions for:

providing a non-migratable binding key loadable by a basic input/output system (BIOS) in the TPM;

providing an encrypted symmetric key and an encrypted encryption key in the storage medium to provide a secure storage medium;

providing an unbind command from the BIOS to the TPM based upon an authorization to provide a decrypted symmetric key, wherein the unbind command includes the encrypted symmetric key and an authorization digest, wherein the authorization digest is derived from a password authorization prompt and is defined as using a particular payload for the unbind command during a particular instance; and providing the decrypted symmetric key to the secure storage medium to enable use of the computer system.

6. The computer readable medium of claim 5 wherein the BIOS prompts for binding key authorization.

* * * * *

UNITED STATES PATENT AND TRADEMARK OFFICE
CERTIFICATE OF CORRECTION

PATENT NO. : 7,600,134 B2  Page 1 of 1
APPLICATION NO. : 10/984400
DATED : October 6, 2009
INVENTOR(S) : Catherman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Fifth Day of October, 2010

David J. Kappos
*Director of the United States Patent and Trademark Office*